NO PRINTED SPECIFICATION AVAILABLE
9000X
C. Olcott. Sheet 1, 5 Sheets.
Iron Ship.
No. Patented Aug. 15, 1835.
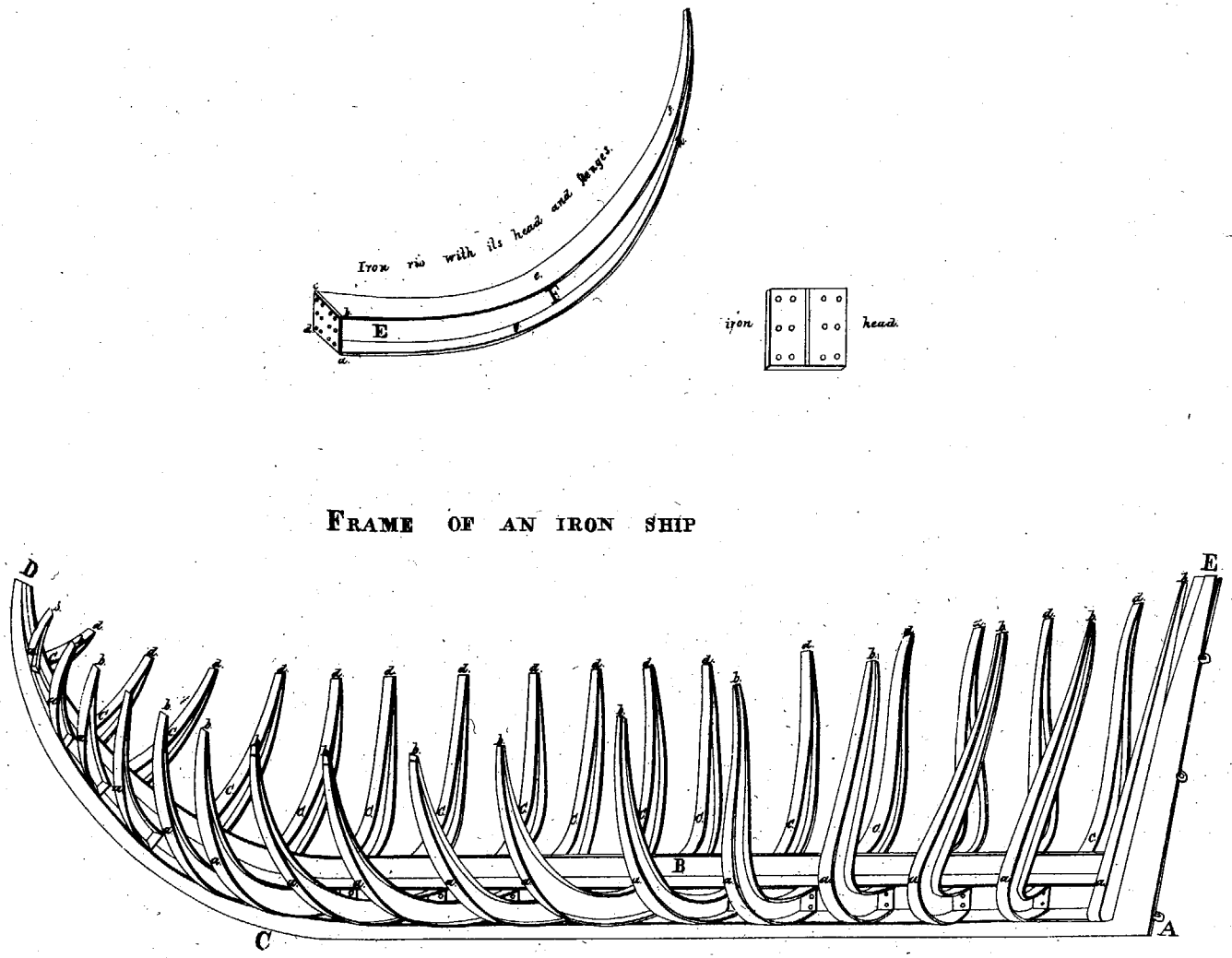
FRAME OF AN IRON SHIP 9000X
NO PRINTED SPECIFICATION AVAILABLE
C. Olcott. Sheet 2, 5 Sheets.
Iron Ship.
No.
Patented Aug. 15, 1835.
STARBOARD HALF OF AN IRON RIVER STEAM BOAT — WITHOUT THE DECK
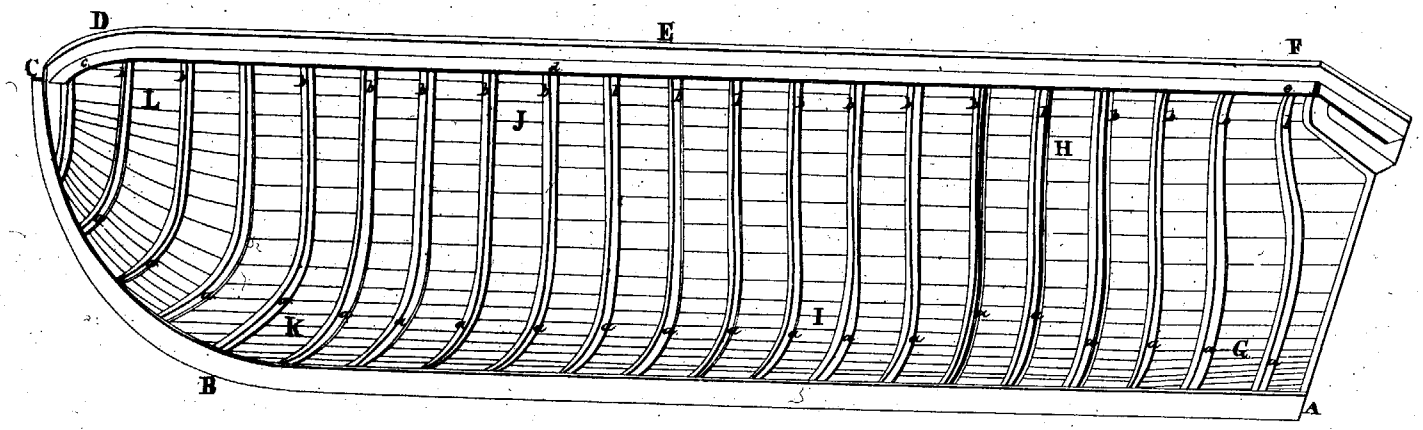
STARBOARD HALF OF THE HULL OF AN IRON SCHOONER — WITH THE DECK.
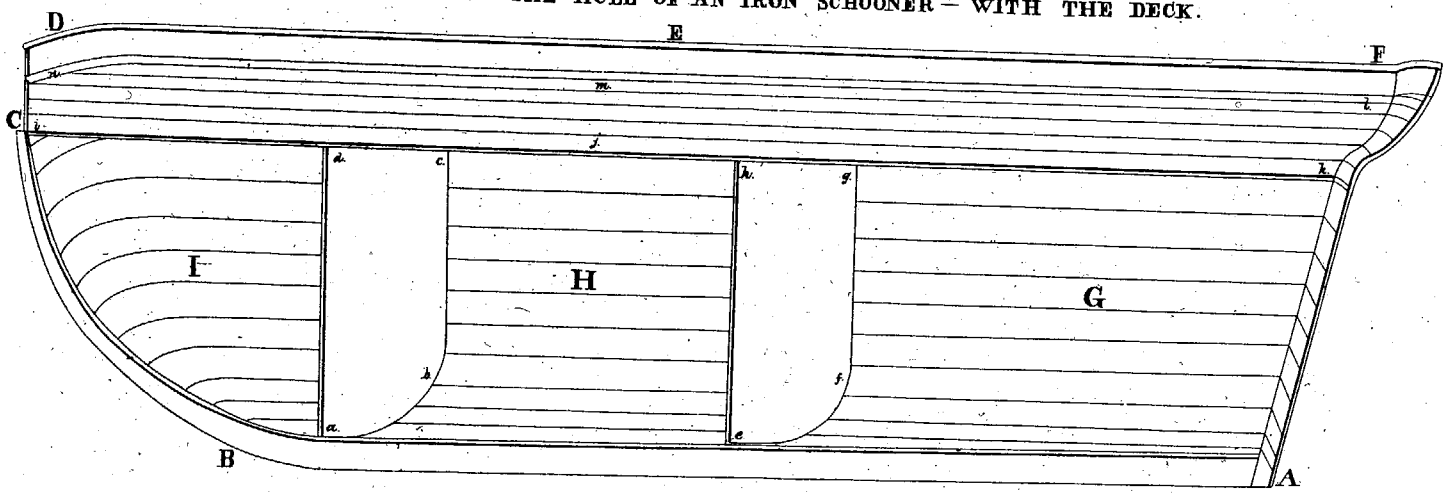

9000X
NO PRINTED SPECIFICATION AVAILABLE
C. Olcott. Sheet 3, 5 Sheets.
Iron Ship.
No. Patented Aug. 15, 1835.
HULL, MASTS AND SPARS OF AN IRON BUILT SCHOONER.
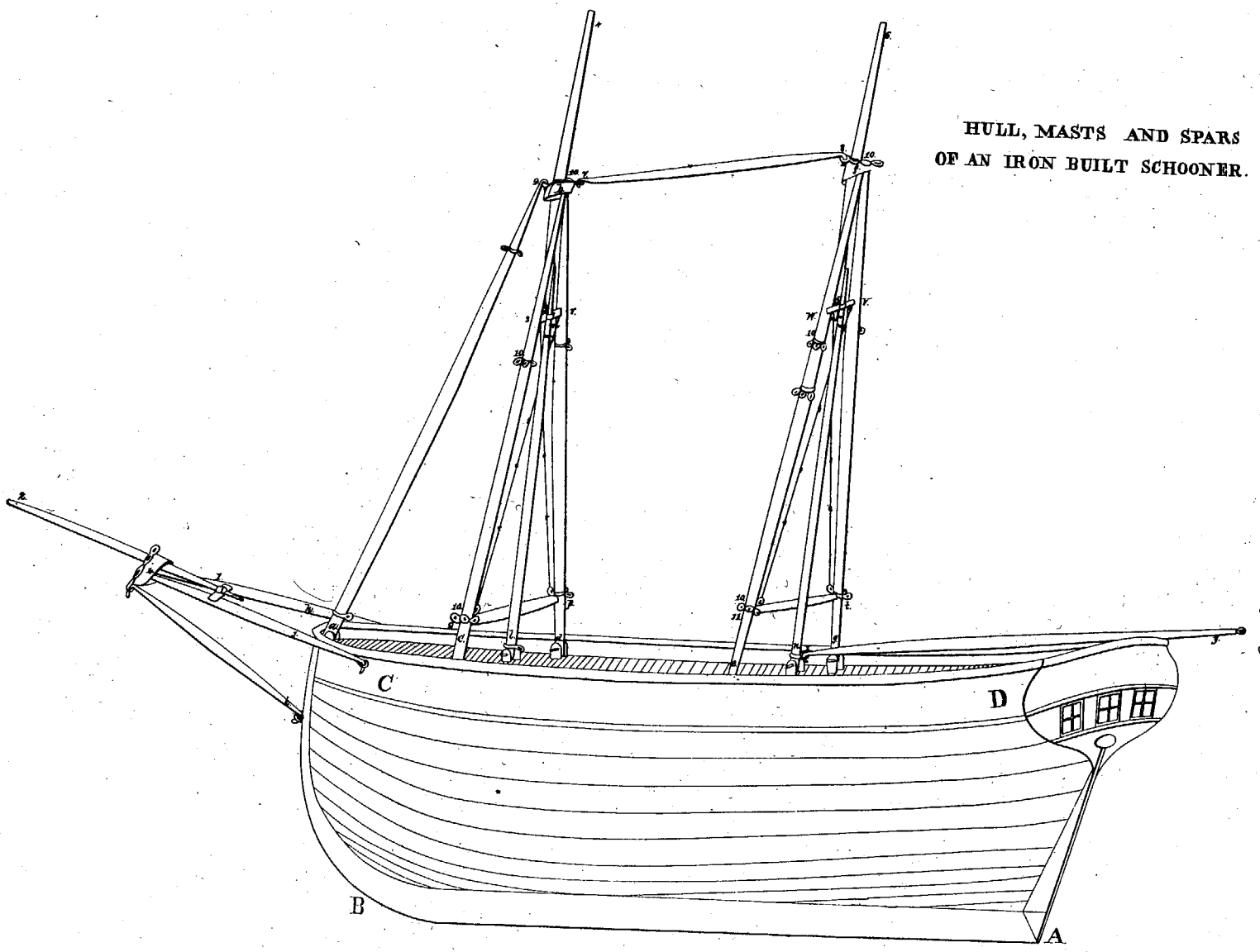

9000X
NO PRINTED SPECIFICATION AVAILABLE
C. Olcott. Sheet 4, 5 Sheets.
Iron Ship.
No. Patented Aug. 15, 1835.
DECK, MASTS AND LOWER YARDS OF AN IRON SHIP
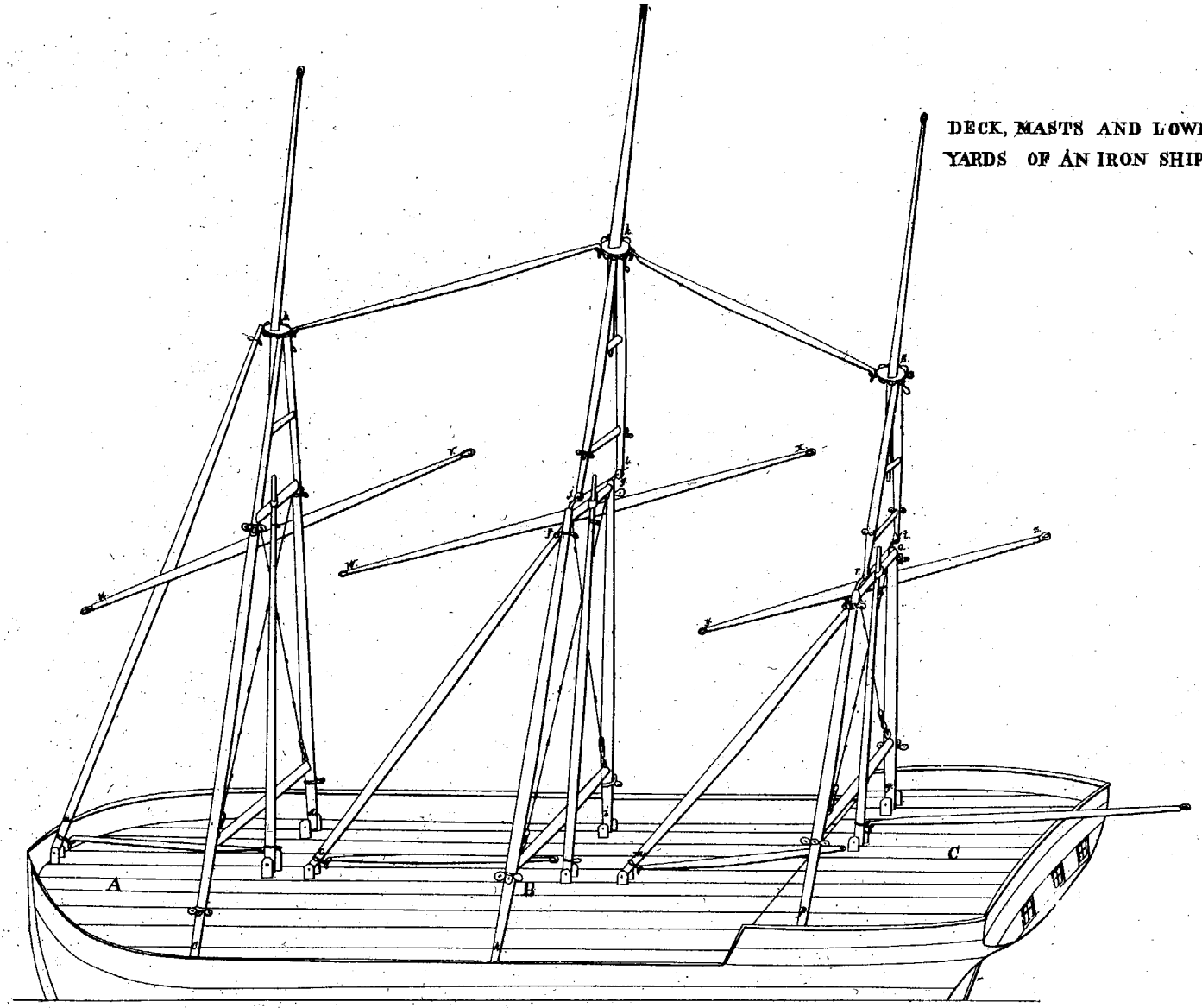

NO PRINTED SPECIFICATION AVAILABLE
9000X
C. Olcott. Sheet 5, 5 Sheets.
Iron Ship.
No. Patented Aug. 15. 1835.
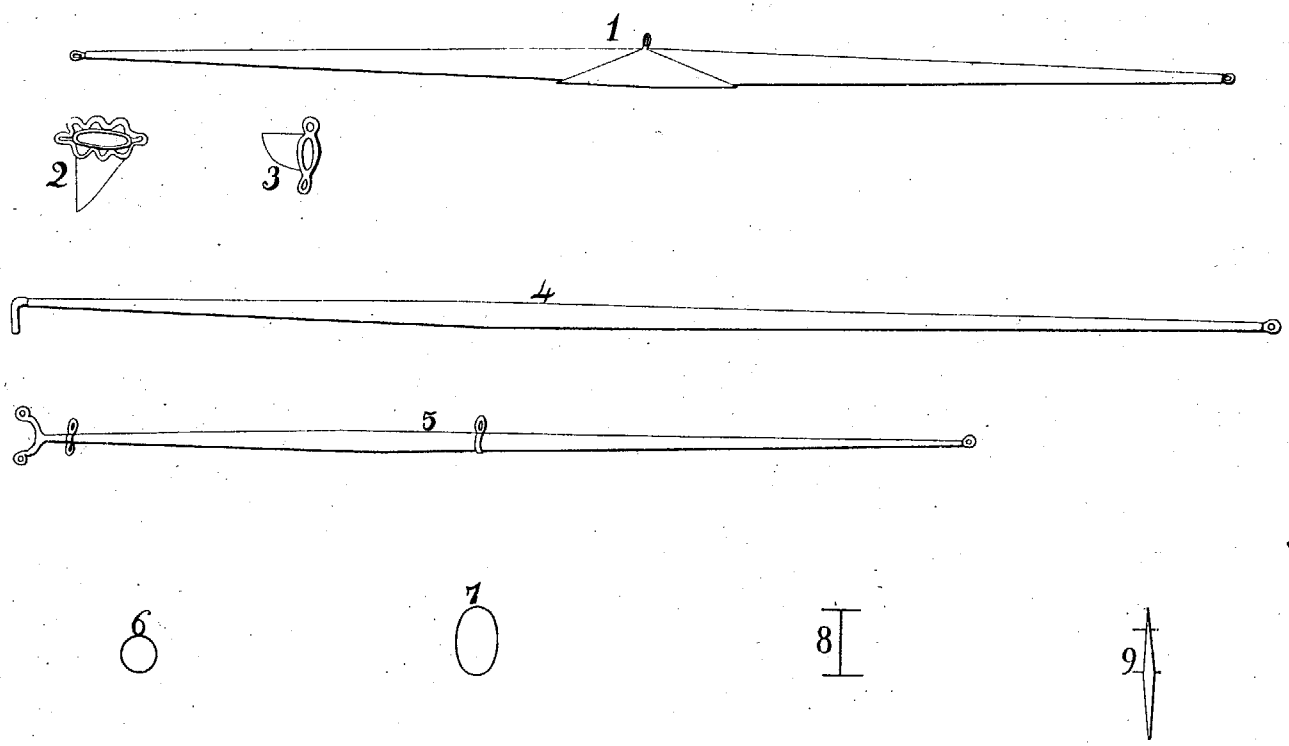

9000X

Charles Olcott. of Medina. Ohio.
Letters Patent

Aug 15, 1835

The schedule referred to, in these Letters Patent and making part of the same containing a description in the words of the said Charles Olcott himself, of his improvement. in Ship Building. and Naval architecture.

---

To all to whom these presents shall come Greeting. Be it known that I Charles Olcott of medina, in the County of Medina. and State of Ohio, have invented a new and useful improvement in Ship Building. and Naval architecture not heretofore known or used, and that the following is a full and exact description thereof. This invention was first made by me in the year 1815 and consists in constructing Ships, and all other kinds of water craft wholly of iron, or of any other metal or metallic compound possessing sufficient strength and firmness for such a purpose. No alteration is made by the invention in the exterior shape or model of vessels.
The relative proportions of the hulls, masts, spars, and other parts of vessels are to be the same, or nearly the same, in ships built on this plan as before as are also the relative size and positions of the masts, and most of the other spars and their rigging, their forms and the materials of which they are made only being changed, nor are any essential alterations made in the general rules of draughting ships except such as necessarily grow out of the improvements suggested by the invention. Agreeably to the inventions the keel is to be of iron and made very broad or deep in proportion to its thickness and it is recommended, if practicable in all cases to cast the keel and stem entire in one piece. It may be thought by some to be impracticable to cast entire such immense keels and stems as are required for ships of one hundred and twenty guns or even of much less size. But I have no doubt this is practicable myself, and recommend it always to be done. Then keels and stems may be cast in separate pieces to be bolted together, but this method is not recommended in any case - they may in also be wrought or forged and various methods have been projected for that purpose. But it is recommended to cast them in all cases, as cast iron rusts much sooner than wrought iron. The keels may also be cast hollow if thought advisable. The keel is to be of the usual shape and length in the water and to be of similar proportions in the water to other keels except as to the thickness. It will vary in thickness according to the size of vessels from half an inch or thereabouts to an inch and a half at the top and bottom or upper and lower edges, and from two to four, five or six inches in the middle of the breadth between the edges according to the size of the keel.
The breadth or depth of the keel may vary from a foot or foot and a half to three, four, five, and even six feet if necessary. Every keel is to have a sufficient number of large bolt holes cut or bored in the upper half of it, at suitable distances from each other to bolt the rib heads, to each keel is to have on it at right angles to its breadth, four rows of large stout flenges to bolt the lower streaks of the coverings to, as well as to strengthen the keel laterally. Two of these rows are to run parallel to each other on the opposite sides of the keel and stem, at right angles to the breadth, midway between the upper and lower edges of the keel, and on its thickest part, so as to correspond with the outer flenges on the ribs.
Two other rows are also to run parallel with the former, on the upper edge of the keel and stem, to correspond with the inner flenges on the ribs. These two sets of rows converge into one on the stem a little above the load water lines.
Another flenge is also to run the whole length of the keel and stem, standing upright in the centre of the upper edge between the two latter rows, to bolt the lower streaks of the centre partition to. These five great flenges are cast with the body of the keel and stem as part and parcels thereof. The ribs are to be of iron, cast or wrought separately, but so as to correspond in opposite pairs and in moulds conforming to the intended curvature of the ships bottom. and they are to extend in length from the keel to the load water lines. There is to be a sufficient number of ribs to render the outer bottom firm and not liable to warp much by the pressure of the water. Gratings may be placed between the ribs for this purpose, but they are not recommended as the warping will be of little or no consequence. The breadth of the bodies of the ribs, at their heads, is to be one half or nearly one half of the breadth of the keel, and is to diminish a little towards their upper extremities, till within a short distance therefrom, whence they are to converge rapidly to a point. The bodies of the ribs are to be very thin in proportion to their width, and it is recommended to make them not more than from one to two inches thick at their junction with their heads, for the largest ships, and even less for small vessels, and this thickness is to gradually diminish from the heads to a point at the other end. The ribs may be forged, but it is recommended to cast them in all cases. They may also be cast hollow, but this is not recommended. The heads of the ribs are to be square, to be placed at right angles to the length and breadth of the bodies, the side of the head is to be in length equal to the breadth of the rib, inclusive of the rib flanges, to be at least twice or three times thicker than the body of the rib at the line of their junction, and each head is to have a suitable number, size and location of large bolt holes, corresponding with those in the upper half of the keel, for bolting it thereto. Each opposite pair of ribs are to be bolted to the keel and to each other with the same bolts. Each rib is to have double rows of broad stout flanges on its upper and lower edges, at right angles to the breadth, running the whole length of the rib from the head to the upper end, where they unite in an edge, each flange containing a sufficient number of suitable sized bolt holes to bolt or rivet the bottoms or coverings of rolled iron plates to outside and inside of the ribs.-

A strong stern post of a triangular shape of iron, is to stand upright on the hinder end of the keel between the last pair of ribs, bolted to the hinder - inside flanges, and extending behind the ribs to the end of the keel, to which it is bolted at the bottom - this post will vary in size with that of the vessel, but will diminish in size from the bottom to the top, and will converge to an edge on the back or outside, on which the loops to receive the pintles or rudder hinges are to be bolted. On the inside of the post will be a stout flenge in the centre of its length, at right angles to the thickness, running up and down the whole length of the post - this flenge will be bolt holed the whole length to bolt the centre partition to.- It is recommended to cast this post in all cases, and if it be very large it may be cast hollow, this post need not in general extend any further upwards than from the keel to the rudder post or lower part of the stern. The rudder is to be of the usual size, shape and proportions, except that the blade is to be very thin, and the rudder is to be cast hollow - the helm or wheel is to be wrought of iron made hollow, conveniently shaped, and have the handles covered with woolen cloth and oiled canvass or leather: the windlass and capstan are to be of the usual shape and dimensions cast hollow. Every vessel intended for sea navigation is to have at least two bottoms or coverings up to the load water line, composed of stout plates of rolled iron bolted or rivetted outside and inside to the flanges on the keel stem and ribs and to each other; these plates may be of any other metal sufficiently strong; but rolled iron plates are recommended in all cases. A single outside bottom may be sufficient in some cases, but two bottoms are recommended for all sea vessels. Three or more bottoms can be constructed but no more than two are recommended in any case. The ribs and both bottoms can also be extended to the gun wales, but it is recommended never to extend them any further than to the load water line. The plates may also in fresh water vessels be brazed to the keel and ribs and to each other; but bolting or riveting is recommended in all other cases, it being feared that brazing will create a galvanic action in salt, that will corrode the bottom rapidly. It is also recommended to use plates of great thickness on the outside near the keel and bottom contiguous, say from three fourths of an inch to an inch thick and even more in ships of the largest size, and proportionally less in smaller ones, and to diminish the thickness of the plates from the bottom upwards by degrees to the gun wales, so that at the top they shall seldom exceed a quarter of an inch in thickness in the largest ships and even less than half that thickness in very small vessels. The outer plates should be always so thick as not to warp greatly by the pressure of the water, though this is not very material. The inner covering may be of somewhat thinner plates, decreasing in thickness up to the load water line, where the covering terminates. This covering may if necessary be furnished with small hatchways between the ribs, so as to permit persons to pass between the bottoms of large ships, and it is recommended to roll the edges of the plates so thin, that there shall be no ridges on the laps, and the bottoms be smooth and even. The bow and sides above the load water line are to consist of one thickness of plates only, bolted to a suitable number of upright flat iron flange bars placed on the inside and extending from the load water line to the upper deck each of these bars is to be curved to correspond with the lines of the draught of model of the vessel, and each is to have a strong flange in the centre
line of the length towards the inside of the vessel, with rows of bolt or rivet
holes, on each side of the flange through the body of the bar, the whole
length thereof. These size of these bars and their flanges is to vary with that of
the vessel. but they are to be largest at the bottom, and to converge nearly to
a point at the top. They may be cast, but it is recommended to make them
always of wrought iron. They may be also be placed horizontally if thought ad-
visable. The inside covering may be continued above the load water line, but
it is not recommended. The stern is to be of the usual shape and dimensions
and to consist of one covering only bolted or rivetted to flange bars of a
proper size and curvature. In all sea vessels intended for freight only there
is to be a water tight partition consisting of iron plates extending through the
whole length of the vessel from stem to stern, and from the keel to the up-
per deck, and dividing the vessel lengthwise into two equal parts. The plates
are to be bolted or braized to the upright flanges on the keel and stem,
the flange on the stern post to upright flange bars, and to each other, and
are to diminish in thickness from the bottom to the top. Below the load water
line it is recommended to use pretty thick plates, above it very thin ones.
At right angles to this partition are to be other partitions at suitable distan-
ces from each other, constructed of similar materials, and in a similar man-
ner, and dividing the hull into a corresponding number of water tight apart-
ments. and it is recommended to divide every sea vessel into not less than
six or eight of these apartments, though a less number and even none at
all may answer for river navigation and in some other cases.
The first partition forward should stand on the junction of the keel
and stem and sloping or inclining to the keel backwards at an angle of
seventy five or eighty degrees, the other partitions may be upright, any number
of these partitions may be thus made and extended in any direction at
pleasure. All the flange bars attached to the partitions should be of suf-
ficient size at the bottom for the requisite strength, and to diminish
from the bottom upwards so as to converge nearly to a point at the top,
and it is recommended to make all vessels intended for freight only
with only one deck, and without any quarter decks, in vessels of one deck only, the partitions should extend the whole depth from the deck to the keel, but where they have two or more decks, especially in men of war the partitions may extend no farther upwards than the lower gun deck, the upper decks being supported when necessary by iron stanchions. each apartment is to have its own hatchway, the hatches being of iron plates bolted to grated frames and turning on one side upon hinges. and it is recommended to have no lateral communications between the different apartments. The decks are to be composed of rolled iron plates of sufficient strength to sustain any ordinary weight without warping, bolted to strong flange bars extending across the vessel from side to side with a slight but regular curvature upwards, and with the flanges downwards. across and at right angles to these when necessary smaller bars may be laid, and yet smaller ones on these last, and so as to form a sort of grate or lattice work in which case the deck plates may be small and light. The edges or extremities of the deck are to rest on and be bolted to a strong broad horizontal flange extending the whole circuit of the vessel. This great flange being bent at right angles in the centre of its length throughout and bolted to the sides and deck, will perform the office of a continuous circuit of knees, and add great strength to the vessel. It is recommended to make this and all the flange bars of wrought iron only. Where the partitions extend up to the deck, the deck bars may be very small and light, they being to sustain but very little weight unless the deck be loaded. The decks may be further supported and braced by iron knees, but it is presumed these will be unnecessary. The deck and cabin floors are to be lined with thin pointed boards. and it is recommended to line the sides of the cabins, birth, forecastle &c with [illegible] canvass or other strong cloth stuffed with wool or cotton. The gunwales and taffrail of thin iron plates are to be surmounted with a strong iron rim turned outwards and extending the whole circuit of the vessel, which it is presumed will impart to them sufficient strength, but if necessary the wales may be further supported by iron knees bolted to the wales and deck scuppers are to be piercud at convenient distances round the whole circuit of the deck. The masts, bowsprit, booms, gaffs, yards, and all the other spars are to be composed of iron plates rolled in a cylin-
drical or oval shape and connected endwise to each other by bolting rivetting
or brazing into tubes or pillars mostly resembling opposite cones or frustrums
of cones united at their bases on the figure called the spindle. the pieces
composing the spars may be cast, but it is recommended in all cases to
make them of rolled iron plates. the spars may be made of any other
suitable metal, iron being recommended chiefly on account of economy
good steel is an excellent material for the smaller work. it may be used
to advantage for the caps and all other parts where great strength is required
The upright spars composing the masts are to consist of very thick plates
at and near the bottom, but these plates are to gradually diminish in
thickness as they proceed upwards, being very thin at and near the top of the
mast. But the diameters of each of the upright spars increase from the deck,
upwards, to from quarter to one third of the whole height, after which they
gradually decrease to nearly a point at the top. The greatest diameter
should be at least twice or three times the diameter at the bottom, and
a greater proportion is recommended in preference to the less. All the spars
are to have a regular curvature in their length from one end to the other
In all ships and other vessels the foremast is to be composed of three
of these large upright spars proportioned to the size of the vessel and one
smaller vertical spar. Two of these large spars equal in length and size,
with their feet standing in sockets elevated two or more feet from deck
or tripods or pillars on opposite sides of the deck, close to the gunwales,
raking a little towards the stern, and as far back from the figure head
as usual, are connected together at the top by a strong iron cap in-
-closing their summits, through which several bolts pass.
The sockets may be placed on the outside of the vessel, but this is not
recommended. The caps also may be advantageously made of steel
or brass great strength being required in them. A horizontal iron
cylinder with stout thimbles on each end through each of which a spar
is inserted passes between these spars several feet below the cap.
Another cylinder and thimbles passes between them still further below, and
about eight or nine feet above the deck to clear the heads of the crews.

Between the diagonal ends of these two cylinders two strong chains extend from loops there fastened, each from one spar to the other, crossing each other in the passage and are hove taut when necessary by falls near their lower ends. Midway between these large spars stands a smaller vertical spar, the upper end of which passes through a thimble or loop attached to the centre of the back part of the upper cylinder, the lower end being inserted in a socket near the deck. To this last spar the mast hoops of the foresail are attached. The fore boom is hooked near its lower end into a large loop there; and the fore haliards are attached to the upper end by another loop there fastened, the horns of the gaff sliding on the spar as usual.
In brigs this spar is wanting, the peek haliards of the fore sail are attached to the back part of the fore cap by a loop there fastened. The fore cap or cap of the fore mast is enlarged in front of these side spars in a circular or oval form to receive the fore top mast, which is a single vertical spar, and steps into a thimble or loop on the centre of the foreside of the upper cylinder. After describing the circle the cap is formed into a strong loop in front, into which is hooked the top of the third large spar, the bottom of which is bolted into a socket just behind the figure head so as to stand nearly on the stem. This should be the strongest upright spar in the vessel. On this spar run the mast hoops of the fore stay sail. In the construction of schooners and all other two masted vessels the main mast is made in all respects like the fore-mast except that the front spar which supports it fore and aft passes between the fore cap and the upper cylinder of the main mast, or when necessary between the fore and main caps being hooked into loops on each respectively.
This last mentioned spar will in general be small and light. each of the upright mast spars is to stand on a strong stanchion placed beneath the spar under the deck being bolted to the sides of the vessels. The booms and gaffs are to be constructed in a manner similar to that of the other spars described, except that their largest diameters are to be somewhat nearer their centres in length. In other respects they are to be of the usual proportions and rigged in the usual manner; the greatest diameter of the yards is to be at their centres or equidistant from their extremities, and it is recommended to make the yards very large and strong in the middle, but 4000X 9000X 141 light and small at the ends. For this purpose a wide band should pass round
the middle of each yard converging to a strong loop on the upper side, otherwise
they are to be slung and rigged in the usual manner. Similar bands are re-
commended for the gaffs. and it is also recommended to flatten all the yards,
cylinders, and most of the other spars into an oval or elliptical shape, and so
that their largest diameter shall be at least twice the length of the corresponding
smallest ones, and to sling or place each spar when in use, in such a position
that the greatest diameters of each shall correspond with the direction of the
greatest strain on the spar, much additional strength will be imparted to the
ships tops by this improvement. the ends of the yards and the outer extremities
of the booms and gaffs are to have large loops in them to receive rigging,
and other loops are to be attached to them wherever necessary for that purpose
broad bands converging into loops are to be worked around them as before
directed. any convenient number of loops, rings, belaying pins &c wrought of iron
are to be attached to the different parts of the vessel wherever required; and
it is strongly recommended to construct all the spars by brazing. The bowsprit
is to be constructed in most respects like the foremast, except that the jib boom
is to pass through a large circular or elliptical hole in the back or upper part
of the sprit cap. The bowsprit is rigged wholly outside the bow, its upper spars
hooking into loops fastened on the upper part of the opposite sides of the bow
and the under spars hooking into loops on the sprit cap, and the stem. these
spars should be made very strong and the two upper ones be braced when
necessary by cross chains. The lower spar may if necessary be armed with a
cut water. in lieu of the common shrouds, short strong hollow arms wrought
of iron are attached at suitable distances on the out sides of the upright side
spars compassing the masts, at right angles thereto, with ropes passing between
their extremities and centres, on which the ratlines are attached; chains instead
of ropes may be used, but the latter are recommended. The round tops are
to be made of iron wire work of an oblong form on the tops and around
the caps, and to be kept well painted and varnished. The cat heads and
all the other necessary appendages of solid materials are to be constructed
of hollow iron wire work and as nearly of the usual forms as may be.
As the spars composing the masts of two masted vessels stand elevated 4000X [illegible]

above the d k in sockets, they are readily eased down upon deck by falls, and as easily raised again, the main mast when down rests in strong iron supports on booms r ised from the taffrail so as to clear the steersman. there is also a contrivance to slip the mainmast in case of extremity. instead of standing in sockets rai d from the deck, the side spars belonging to this mast may stand on heavy l ops raised on pillars or other supports, and standing in or outside the wales. A heavy bolt passes through strong ears fixed to the sides of the foot of each s n, and through the loops. If the vessel be on her beam ends, by driving out the bolt on the upper side the mast will roll over and hang along side the other side of the vessel by the fore cap and the opposite loop. All parts of this foot work should be made very strong. But as this kind of vessels will not be very liable to capsize, it is recommended to dispense with this contr ance in large ships altogether. Such is the essential construction of all two masted iron vessels. all other such vessels on the plan of this invention are to be constructed with similar materials and with a few necessary variations in a similar manner. All three masted vessels are to have their lower masts composed of four spars, each placed in the manner already d scribed each spar being bolted into its own socket, which is elevated a little above the deck in the manner already described. But in th construction of the main mast the side spars instead of coming to a poin at the Top like the masts already described, are connected at the top b a horizontal cylinder of a proper length with thimbles extending between them. at the centre of this cylinder the front spar is hooked. Strong b ace chains are to cross between this cylinder and the one below it in the manner already described. The feet of the main top mast spars composed each of double parallel loops at the bottom of each spar, stand bolted to other heavy loops fixed on the tops of the main spars and bent backwards, these top mast spars then converge to a point at the top, where they are united by a cap in the manner already described with its circle or ellipse to receive the main top gallant mast. the spars of the main top mas are also connected to each other by a cylinder at their bottoms and an[illegible] near their tops. Brace chains may cross between these cylinders if necess y to support this mast fore and aft, a light spar passes from the main top cap to the back part of the fore cap, being hooked into loops at
both ends. The mizzen mast and top and gallant masts are considerably
shorter than these last, but are constructed and rigged in a manner pre-
cisely similar. The mizzen top mast is however supported fore and aft, by a
light spar extending from its cap to the lower cylinder of the main top mast
or as is strongly recommended between the mizzen top and main top caps.
It is evident from this arrangement, that the main and mizzen top masts
can be struck with despatch and safety. It is also evident that the lower masts
standing, as they do in sockets can be lowered and raised at pleasure, the shroud
arms and all the other appendages of the tops are to be constructed in the
manner described, and the yards, booms and gaffs are to be located and
disposed of in a similar manner. In all three masted vessels on the front
spars of each mast are to be rigged stay sails, on the vertical central spars
of the fore and masts lateen sails, and on the spar belonging to the mizzen mast,
a large mizzen sail. These large sails will give to heavy ships advantages for
beating, which they have not heretofore possessed. every ship or three masted
vessel built on this plan will have therefore three stay sails, two lateens one
mizzen three square top sails, three square top gallant sails besides jibs and
studding sails, in the whole not less than fourteen sails and more if necessary.
The jib stays of rope pass from a heavy loop near the fore cap to the cap of the bowsprit
and to the end of the jib boom in the usual manner. The ordinary sails of
every three masted vessel will therefore be at least fourteen in number, and
it will also possess the usual facilities for rigging supernumary sails.
It should here be remarked that the running rigging of this kind of vessels
is in all material respects similar to that heretofore used.
What I claim as my own invention and not previously known in the above
described invention are, the iron keel and stern and their flanges. the stern post
and its flange, the ribs and their flanges all composing the frame and the
shape and materials of said posts, and the mode of putting said frame together.
The partitions and their various flange bars, their shapes and the mode of putting
them together. The bottoms or coverings and the mode of applying or fastening
them to the frame and to their flange bars and to each other. The decks and their
flange bars. the flanges on which edges rest, and the mode of their construction The mast and bowspit with all their various spars, loops, hooks, and brace chains, a d the mode of their construction, together with the cylinders, the standards the boom the gaffs, the yards and the mode of their construction, all exactly in the manne, and of the materials above described. But to all the other parts of the inventio described in the foregoing specification - I lay no claim as being of my inve tion, or seek to obtain any patent therefor.

Witn es

C.H.1 Wharton
Ch. H. Keller

Charles Olcott

Exam
[illegible]

(5505 words)

(Drawing made and placed in the Port-folio)

(Drawing)